United States Patent [19]
Ishii et al.

[11] Patent Number: 5,289,275
[45] Date of Patent: Feb. 22, 1994

[54] SURVEILLANCE MONITOR SYSTEM USING IMAGE PROCESSING FOR MONITORING FIRES AND THEFTS

[75] Inventors: Hiromitsu Ishii, 5-2-801, Takasu 3-chome, Chiba-shi, Chiba; Takashi Ono, Kashiwa; Kiyoshi Watanabe, Sagamihara, all of Japan

[73] Assignees: Hochiki Kabushiki Kaisha, Tokyo; Hiromitsu Ishii, Chiba, both of Japan

[21] Appl. No.: 911,506

[22] Filed: Jul. 10, 1992

[30] Foreign Application Priority Data

Jul. 12, 1991 [JP] Japan .................... 3-172062
Jul. 12, 1991 [JP] Japan .................... 3-172063

[51] Int. Cl.⁵ .............................. H04N 7/18
[52] U.S. Cl. ......................... 348/154; 340/578; 348/159
[58] Field of Search ............ 358/108, 105; 340/517, 340/577, 578, 588, 589; H04N 7/18

[56] References Cited

U.S. PATENT DOCUMENTS

| | | | |
|---|---|---|---|
| 3,988,533 | 10/1976 | Mick et al. | 358/108 |
| 4,052,716 | 10/1977 | Mortensen | 340/578 |
| 4,074,225 | 2/1978 | Vandeweghe | 358/108 |
| 4,160,998 | 7/1979 | Kamin | 358/108 |
| 4,257,063 | 3/1981 | Loughry et al. | 358/108 |
| 4,633,230 | 12/1986 | Tam | 340/517 |
| 4,737,847 | 4/1988 | Araki et al. | 358/108 |
| 4,777,527 | 10/1988 | Camps et al. | 358/108 |
| 4,803,469 | 2/1989 | Matsushita | 340/577 |
| 4,992,866 | 2/1991 | Morgan | 358/181 |
| 5,079,422 | 1/1992 | Wong | 340/577 |

Primary Examiner—Tommy P. Chin
Assistant Examiner—Richard Lee
Attorney, Agent, or Firm—Max Fogiel

[57] ABSTRACT

By using the ratio of the G component to the R component G/R, or the ratio of the B component to the R component B/R, from a television monitor image, and referring to a conversion table for converting to distribution temperature, a surface temperature of a flame is found for each pixel. An area in which luminance signals included in an image of a surveillance area exceed a prescribed level is sampled as a flame outline, and at least the distribution temperature of a sampled flame region is detected, and distance to a radiant energy source is measured. The amount of radiant energy from the radiant energy source is estimated by computation, based on the sampled flame area and its distribution temperature and the distance to the source of radiant energy. The system is provided with a fire image recognition section for recognizing a fire from radiant energy itself and from change in radiant energy over time and outputting fire detection information and an intruder entity recognition section which, from monitor images from the same camera, recognizes an intruder entity and outputs burglary detection information. Processing modes are provided enabling fire and/or intruder entity image processing to be selected. If abnormality detection information is received using fire image or intruder entity recognition processing, a pre-alarm is outputted in the central monitor room, and also the monitor image in the central monitor room is switched to the image of the location where the abnormality has been detected.

4 Claims, 5 Drawing Sheets

SURVEILLANCE MONITOR SYSTEM USING IMAGE PROCESSING FOR MONITORING FIRES AND THEFTS

BACKGROUND OF THE INVENTION

1. Field of the Invention

The present invention relates to a surveillance monitor system for monitoring fires and thefts, in particular one designed so that it can recognize and warn of both fires and thefts by monitoring images from the same television camera. The invention also relates to a surveillance monitor system which detects a fire by a fire detection method using images of a surveillance area, from which the system deduces the radiant energy of the radiant energy source and, from this data, judges whether there is a fire.

2. Description of the Related Art

There are known fire monitor systems using television cameras and having the virtue of providing a great quantity of information and monitoring a large surveillance area. Also there are known burglary monitor systems using television cameras.

An example of a fire monitor system using a television camera is Japanese Patent Laid Open 1-268570, a fire extinguishing system.

This system can recognize the size of a flame and detect the position of a flame by processing luminance signals of a monitor image obtained by a monitor television camera. In more detail, it compares an image's luminance signals with a threshold value, and judges a part of the image whose luminance signals exceed the threshold value to be a fire source. As an example, this method for detecting a radiant energy source based on luminance signals is used for detecting a radiant energy source for the purpose of controlling an extinguishing system in Japanese Patent Laid Open 1-268572. If there are a plurality of flames it extinguishes the fire by controlling the nozzle based on arranging the targets to be extinguished in order of size from the largest flame downwards.

Again, an example of an anti-burglary monitor system using a television camera is Japanese Patent Laid Open 2-171897, an abnormality monitor system. In this system a reference image of the surveillance area in its normal state is memorized beforehand, and edges in a current image obtained by the television camera are sampled and compared with the reference image. Then only (an edge or) edges which appear/(s) in the current image but not in the reference image are/(is) sampled, and if the number of pixels of the area surrounded by the edge exceeds the threshold value number, it recognizes it as an intruder. Also the new edge information of current images is constantly logically added to amend the reference image so that, even though the shadows of objects in the room move with the movement of the sun, these shadows are not mistakenly recognized as intruders.

However, known monitor systems using television cameras were divided into systems monitoring fires and systems for anti-burglary monitoring, and thought of separately, so that even if they were installed in the same building, they were installed as separate systems and also the data from the two systems was processed separately, resulting in the following problems.

First, compared with monitor systems using presently used fire sensors and intruder detectors the system cost of a monitor system using a television camera was rather high because an image processor exclusively for processing the enormous quantity of data were used. As a result surveillance monitor systems using a television camera are not in widespread use.

Second, the image processing technology for recognizing fires and for recognizing intruders had not been perfected or brought to maturity, and therefore there was still the possibility of some other cause being mistakenly recognized as a fire or intruder. Thus, the automatic issuing of an alarm based on image recognition was a problem from the point of view of reliability, just as it was with conventional fire sensors and intruder detectors.

Third, particularly in the case of fire detection based on the known method depending solely on luminance signals, lights other than fires, for example reflected light of headlights, or sunlight, sometimes caused the luminance signals to exceed the threshold value. As a result it was difficult to distinguish correctly between changes in luminance signals due to a fire and change in luminance signals due to other causes, and thus fire detection systems using images had the disadvantage of not being sufficiently reliable.

SUMMARY OF THE INVENTION

Accordingly, an object of the present invention is to provide a fire prevention monitor system using image processing, which, even in the present state of image recognition art, can improve the reliability of monitoring performance while having an equipment cost reduced to the lowest possible level.

It is a further object of the invention to provide a fire monitor system which performs fire detection based on an image-using fire detection method which is devised so as to be able to accurately judge whether an abnormality in a monitor image is a fire or not by deduction based on the radiant energy of the abnormality.

To these ends, the present invention is of the structure explained below. The numerals correspond to those in the drawings.

A surveillance monitor system of the present invention using image processing is provided with image-taking devices 10-1~10-n and fire image recognizer 26 which recognizes a fire from an image taken by image-taking devices 10-1~10-n and outputs fire detection information, and intruder image recognizer 28 which recognizes an intruder from the images taken by image-taking devices 10-1~10-n and outputs a burglary information, and mode switcher 24 which specifies that image processing be of images from fire image recognizer 26 and/or intruder image recognizer 28, and image switcher 18 which, when a pre-alarm is outputted, switches the monitor image in the central monitor room monitor to the image of the location at which an abnormality has been detected.

As a structure for performing image processing in a surveillance monitor system according to the present invention, the following are provided: image-taking means for taking images of the surveillance area; flame outline sampler 128 which samples the outlines of flames 114 included in images obtained by the image-taking means; at least temperature detection means 122 and 124, or 140 and 146, which detect the distribution temperature of the flame outline sampled by flame outline sampler 128; distance determining means 112 and 130, or 144, which determine(s) the distance to the fire source; radiant energy calculator 132 which calculates the radiant energy E from the fire source, based on (1)

the distribution temperature inside the flame outline, sampled by flame outline sampler 128 and (2) the distance to the flame source; and 134 which judges whether there is a fire or not, using the fire source's energy E found by radiant energy calculator 132.

The image-taking means takes color images, and from the ratio of the G component to the R component ( G/R ) or of the B component to the R component ( B/R ) in these images temperature detection means 122 and 124 find, for each pixel, the surface temperature of the flame, by referring to a conversion table for obtaining distribution temperatures.

As another example of a temperature detection means, the distribution temperature of images may be detected based on the measurement output of a radiation thermometer.

Further, the fire judging means judges whether there is a fire or not based on the radiant energy obtained in each prescribed sampling period and the change in radiant energy between sampling times.

In addition, the distance detection means establishes the distance to the radiant energy source by using the amount of movement of the lens of the image taking means' autofocus mechanism or by using a distance finder.

In a surveillance monitor system of the present invention using image processing and of the structure described above, one television camera is provided for each surveillance area, and then from its monitor images, fire and/or burglary can be recognized by image processing of fire and/or intruder entity images, according to the mode setting.

As a result, the image processing hardware, namely television cameras, ADC and frame memory, can be used in common for both fire monitoring and burglary monitoring. In fact, all that is required is to load the fire image recognition software and the intruder recognition software. Therefore, as the system structure is simpler than with separate systems and a large reduction in cost can be achieved more widespread use of surveillance monitor systems using television cameras can be promoted.

Further, even if the technology for recognition of fire and intruders are not necessarily perfect, if a fire or burglary is detected by image processing, a pre-alarm is outputted in the central monitor room and the monitor image is manually or automatically switched to the image of the location where the abnormality has been detected.

Therefore, on receiving the pre-alarm output a surveillance person can verify whether there is a fire, or a burglary, by checking the image of the location, and will then immediately know whether there is an abnormality such as a fire or whether it is a false alarm. Moreover, even if there is an image processing misrecognition, the reliability of the system can be sufficiently maintained despite producing any false report, since a human being sees the television camera image of the actual location and makes the final judgement.

In addition, a surveillance monitor system of the invention performing fire detection by an image-using fire detection method having such a structure samples as a flame outline any outline in an image taken by the image-taking camera whose luminance signals exceed a predetermined level and finds the distribution temperature inside the sampled outline. If the outline shape and distribution temperature are thus found, the radiant energy E from inside the flame outline can be calculated based on the Stefan-Boltzmann law.

Further, from the fact that the size of a flame on the screen varies depending on the distance, the area of the flame on the screen can be revised to the true flame area by measuring the distance to the fire source, and the amount of energy being radiated( amount of heat produced ) from the flames can be estimated.

Thus it is possible, if the radiant energy from the flames can be estimated, to judge whether it is a fire or some other energy source. Also, by looking at the changes, i.e. transitions, in radiant energy of each sampling combined, them it can judge accurately whether there is a fire or not.

That is to say, because it judges whether there is a fire or not by estimating the radiant energy taking the portion which has a constant luminance level as an abnormality, it can perform fire judgement with a high degree of reliability unaffected by the size or shape of the surveillance area.

Also, because it judges a fire by directly detecting the radiant energy from flames, it can judge a fire in a shorter time than known fire detectors which use smoke and/or heat.

In addition, since it can judge a fire from monitor images from a camera, the area which can be covered by one system is increased, and if a surveillance area scanning mechanism and/or zoom mechanism is provided on the camera an even larger area can be monitored.

DESCRIPTION OF THE PREFERRED EMBODIMENTS

Figure 1:
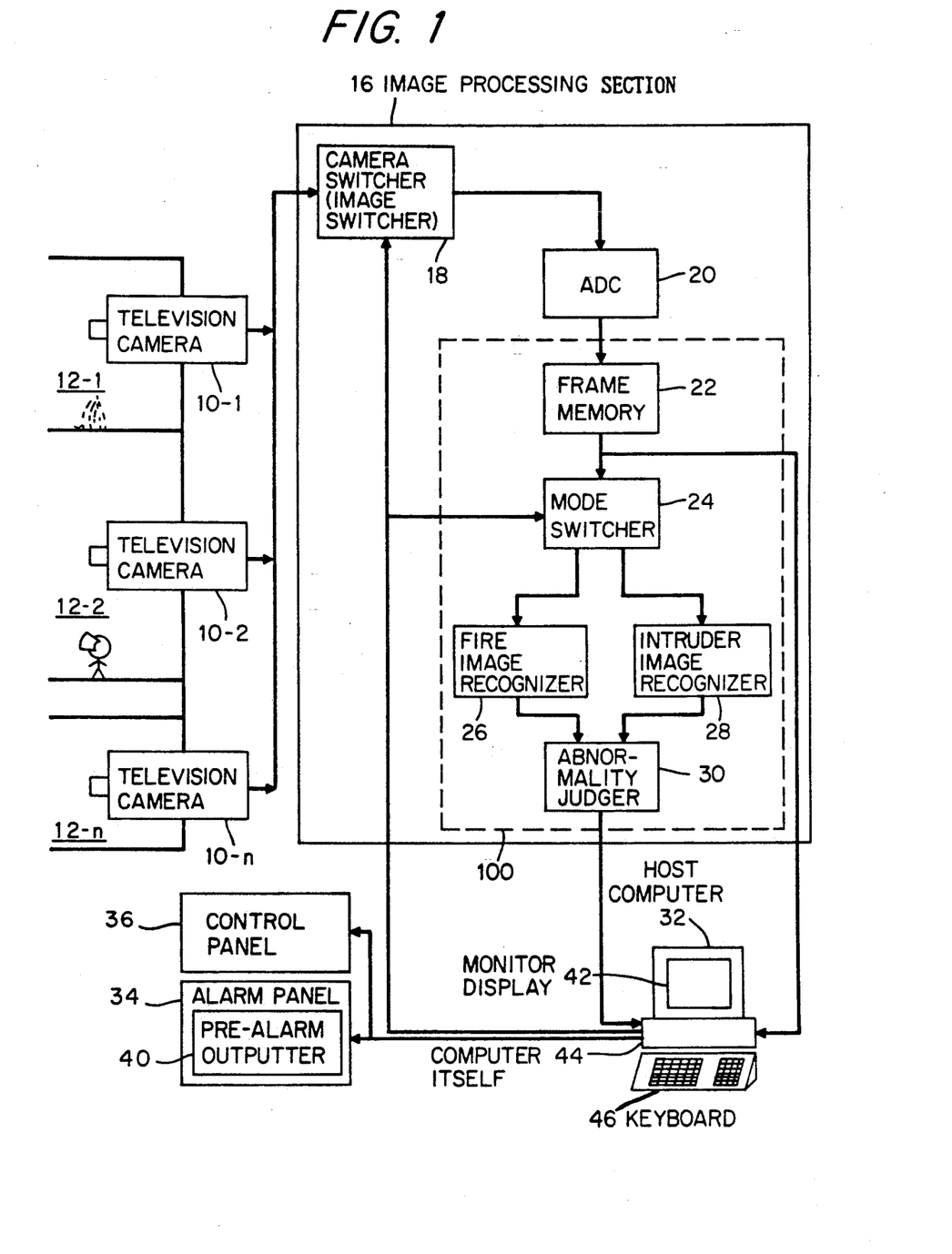
FIG. 1 is a block diagram showing one embodiment of the present invention.
Figure 2:
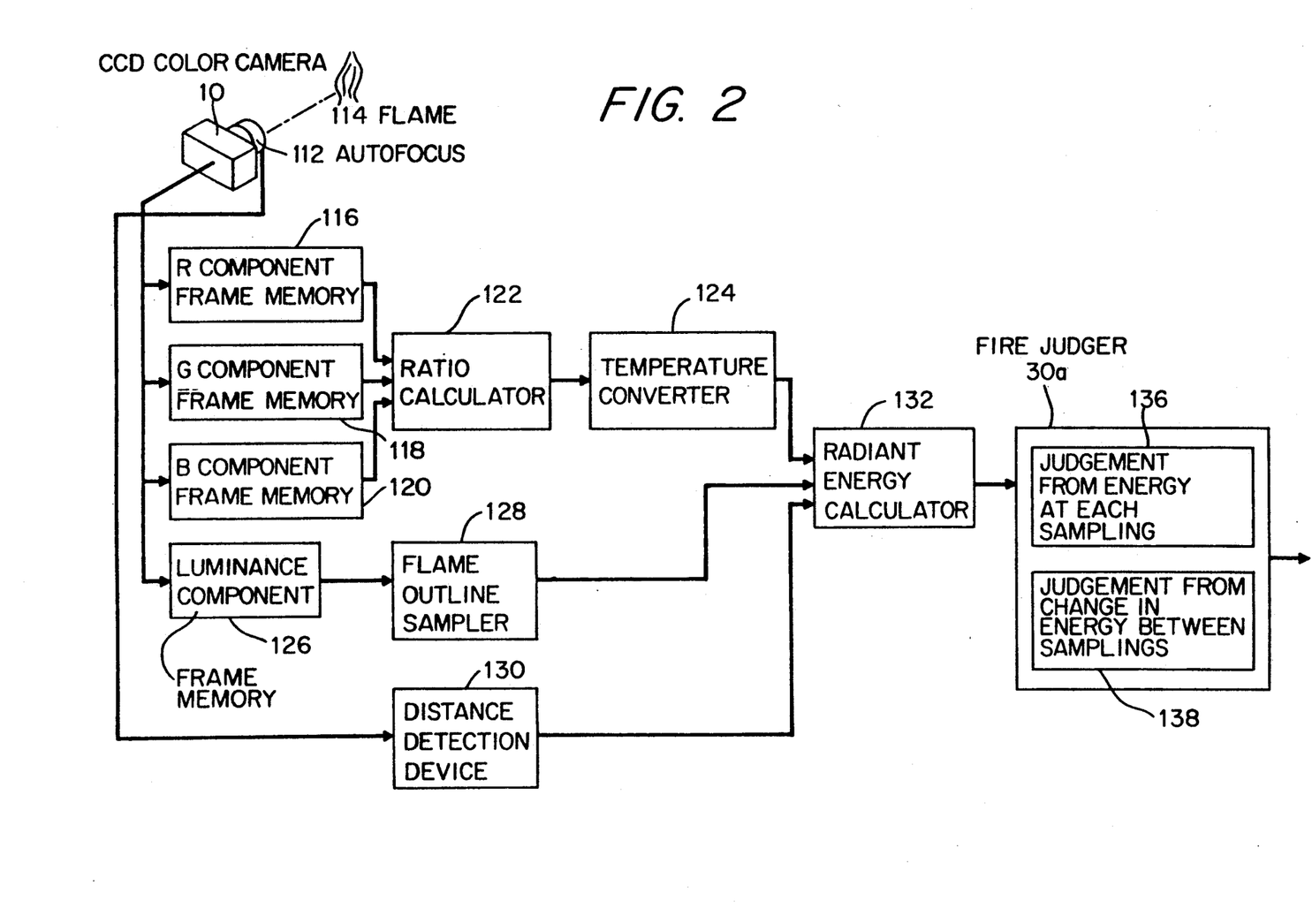
FIG. 2 is a block diagram showing the section relating to fire detection of the image processing unit of the first embodiment of the invention.

FIG. 1 is a block diagram showing the structure of a first embodiment according to the present invention. FIG. 2 shows the structure of the subsections of FIG. 1's image processing section relating to fire detection. In FIG. 1 10-1, 10-2, . . . 10-n are television cameras acting as image-taking devices. In this embodiment one television camera is provided in each of surveillance areas 12-1, 12-2, . . . 12-n, for example one television camera on each floor of a building. As television cameras 10-1~10n, for example color CCD cameras or infrared CCD cameras, or any other suitable image-taking device may be used.

In this embodiment, CCD cameras are used as image-taking means and autofocusses 112 are provided, and, for example, each one is placed in such a position that it can cover the whole of each surveillance area. Also, depending on requirements, the television cameras 10 may be made to scan the surveillance area.

Television cameras 10-1~10n each take an image of the surveillance area once in each determined sampling period, and the color images thus obtained are passed to image processing section 16.

Image processing section 16 comprises camera switcher 18 as image switcher, analog-digital converter ( hereinafter ADC ) 20 and image processor 100. This image processor 100 has a frame memory 22, a mode switcher 24, a fire image recognizer 26, an intruder image recognizer 28 and an abnormality judger 30.

The structure of image processing section 16 will now be described, together with its operation, in detail. Camera switcher 18 switches television cameras 10-1~10-n once in each fixed switching cycle and sends each monitor image to ADC 20. This ADC 20 samples, in a fixed sampling cycle, signals obtained as picture signals, for example RGB R, G and B component signals and luminance signals, on a pixel basis and then converts them into multitonal digital data. Then the data converted by ADC 20 from the frame obtained from television camera 10 is stored in frame memory 22. That is, RGB and luminance signals are stored in R component frame memory 116, G component frame memory 118, B component frame memory 120 and luminance component frame memory 126 respectively. The capacity of frame memory 22 is decided appropriately based on the number of frames needed for image recognition.

Based on mode switch signals from outside, mode switcher 24, which is disposed subsequent to frame memory 22, reads out from frame memory mode switcher 24 image data to be processed. Then it sends them to the specified image recognizer or recognizers, fire image recognizer 26 and/or intruder recognizer 28.

There are three types of mode between which mode switcher 24 switches. They are:

(a) fire image recognition mode;
(b) intruder entity image recognition mode;
(c) fire and intruder entity image recognition mode.

Concretely, in this case the way of using these modes might be to specify for mode switcher 24, for example mode (a) ( i.e. fire image recognition mode ) for the daytime and mode (c) ( i.e. fire and intruder entity image recognition mode ) for the nighttime.

Fire image recognizer 26 samples fire-caused images from the pictures obtained by the television camera and performs recognition on them. As a means for doing this there is a method, e.g. as in Japanese Patent Laid Open 1-268570, of sampling a fire-caused flame portion from the luminance signals in the monitor images and performing recognition. At this time, based on the recognition processing using the sampling of this flame portion, the size of the flame region may be recognized in addition. Also, fire may be recognized from the flicker frequency of a flame detected from luminance signals. Again, fire may be recognized from smoke density or speed of ascent of the fire's smoke, capturing by image processing the smoke from the fire captured in monitor images. Other suitable processing methods for fire recognition by monitor image processing can be used without any modification.

In regard to the above, details of the structure of the present invention are as follows. Fire image recognizer 26 comprises a ratio calculator 122, a temperature converter 124, a flame outline sampler 128, a distance detection device 130 and a radiant energy calculator 132.

Figure 3:
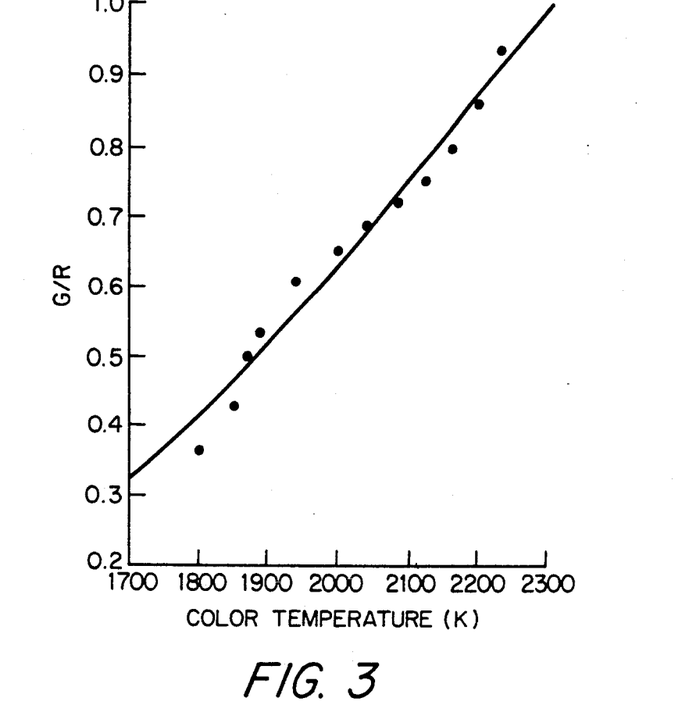
FIG. 3 is a graph showing the characteristic used as a basis for conversion of G/R ratio into distribution temperature ( used for temperature detection ) in the first embodiment of the invention.
Figure 6:
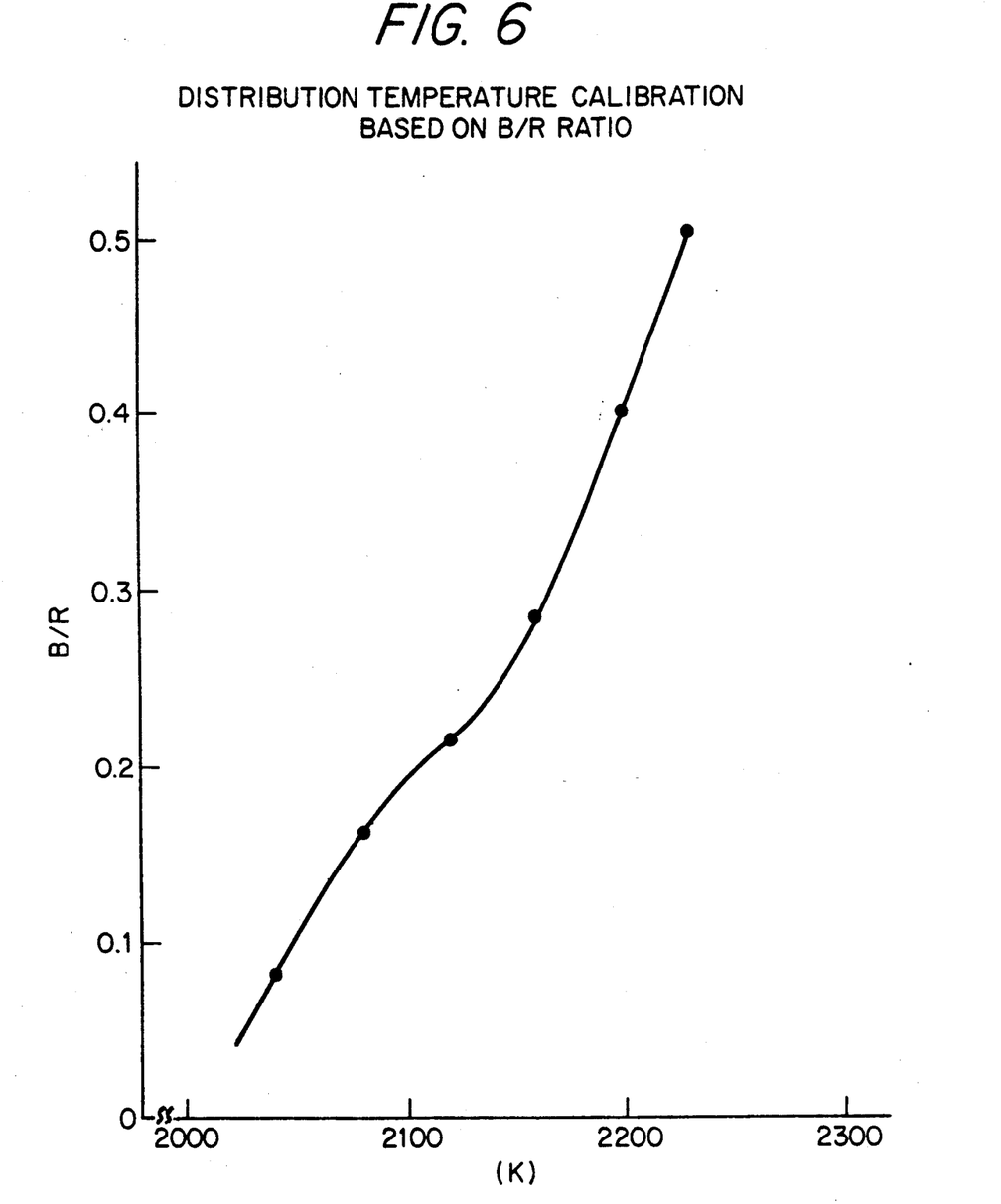
FIG. 6 is a graph showing the characteristic used as a basis for conversion of B/R ratio into distribution temperature ( used for temperature detection ) in the first embodiment of the invention.

Ratio calculator 122 and temperature converter 124 are provided as temperature detection means which detects the distribution temperature of images from television camera 10. That is, ratio calculator 122 calculates the G/R of a G component and an R component ( of the same pixel position ) obtained by reading out G component frame memory 118 and R component frame memory 116. By using a conversion table based on experimentally obtained characteristic ( shown in FIG. 3 ), and by accessing the conversion table with the G/R ratio value obtained by ratio calculator 122 the distribution temperature for each pixel can be found based on the characteristic of FIG. 3. Also, the distribution temperature for each pixel may be found from the B/R ratio by calculating B/R, the ratio of the B component to the R component, and using a conversion table based on experimentally obtained characteristics shown in FIG. 6.

Flame outline sampler 128 is disposed subsequent to luminance component frame memory 126. Among the luminance signals stored in luminance component frame memory 126, flame outline sampler 128 samples as flame outlines the outlines of regions which exceed a prescribed level. The signals showing the amount of movement of the image-taking lens caused by autofocus control by television camera 10's autofocus 112 can be passed to distance detection device 130 and the distance to the in-focus position, e.g. the distance to flame 114, can be calculated.

The temperature found by temperature converter 124, the outline information obtained by flame outline sampler 128, and the distance to flame 114 detected by distance detection device 130 are passed to radiant energy calculator 132 and calculation to estimate the radiant energy inside the flame outline is performed.

The calculation performed by radiant energy calculator 132 is based on the Stefan-Boltzmann law. The temperature T of the flame is given by the following equation:

$$E = \epsilon \times \sigma \times S \times T^4 [\text{watt}] \quad (1)$$

But
$\sigma$ = Stefan-Boltzmam constant = $5.67 \times 10^{-8} [\text{W} \cdot \text{m}^{-2} \cdot \text{k}^{-4}]$
S: surface area of flame [m$^2$]
$\epsilon$: radiation rate.

Here radiation rate $\epsilon$ and $\sigma$ are treated as constants. For the radiation rate it was found by experiment that a value of approximately 0.2 may be used.

Figure 4:
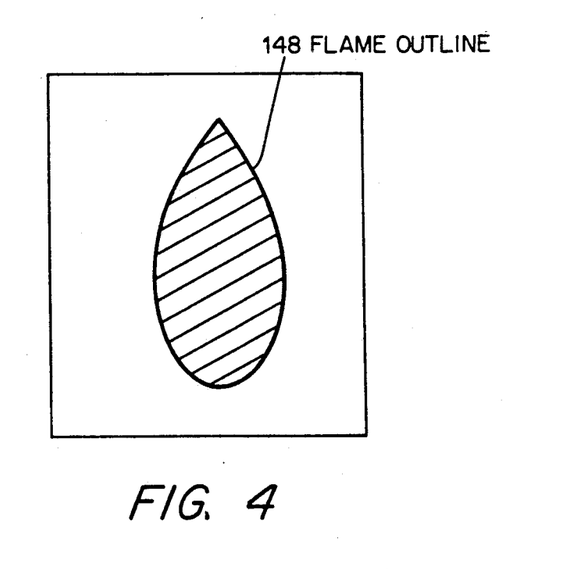
FIG. 4 is a diagram showing sampling of a flame outline in the first embodiment of the invention.

FIG. 4 shows one example of a flame outline 148 sampled by flame outline sampler 128 from an image of luminance component frame memory 126. For pixels of the diagonally hatched area inside the flame outline 148, convolution integration of ( $Si \times Ti^4$ ), in which Si is the area of 1 pixel and Ti is the temperature of each pixel, can be carried out, by using the temperature obtained by temperature converter 124. Concretely, $$E = \epsilon \cdot \sigma \cdot \sum_{i=1}^{n} Si \cdot Ti^4 [\text{watt}] \quad (2)$$

may be used. n is the number of pixels inside the flame outline.

Further, the area S of an individual pixel, used in the calculation of equation (2), is converted into the area on an actual flame by using the detected distance from distance detection device 130. Note that here the area of the flame is for the flame considered as a plane.

Whereas fire image recognizer 26 performs sampling of fire images, intruder image recognizer 28 is for sampling and recognizing intruder-related images from the pictures obtained by a television camera. As a method for doing this, it compares the edge information of a current image with a reference image such as is described in Japanese Patent Laid Open 2-171897 and can use processing which recognizes as an intruder entity an edge portion which appears in a current image, but not in a reference image. Of course, this is not the only possible recognition processing method. Suitable methods for recognizing the human body using image processing may be used without any modification.

Next, abnormality judger 30, which comprises fire judger 30a and intruder judger 30b (the latter not shown in the illustrations ), judges whether an abnormality is a fire or a burglary, based on the recognition result output by fire image recognizer 26 or intruder image recognizer 28. Taking fire judgement as an example, it compares the recognition result outputted by fire image recognizer 26, for example the number of pixels, showing the size of the flame, with a predetermined threshold value, and if there is a threshold value abnormality it judges that there is a fire. Besides simple judgement based on comparison with a threshold, it finds the amount of change over time, based on a a previous recognition result and this time's recognition result, and if this amount of change over time exceeds a predetermined value it judges that it is a fire. Further it may also be arranged that, based on a plurality of previous recognition results, for example it finds the value of each constant a, b and c in a quadratic function $y=ax2+bx+c$, predicts the amount of time remaining till the threshold level at which there is judged to be a fire will be exceeded, and if this time remaining is below a threshold level, makes a predictive judgement of judging that there is a fire.

In detail, according to the present invention, fire judgement is performed as described next. Referring again to FIG. 2, the radiant energy inside the flame outline calculated by radiant energy calculator 132 is passed to fire judger 30a, which judges whether there is a fire or not. Fire judger 30a is provided with No. 1 judger 136, which judges whether there is a fire or not from the radiant energy of each sampling, and No. 2 judger 138, which judges whether there is a fire or not from change in radiant energy between sampling times, that is to say from radiant energy transition. For example, No. 1 fire judger 136 has two threshold levels, a higher one and a lower one, and if the radiant energy exceeds the higher threshold level then it immediately judges that there is a fire. On the other hand, if the radiant energy exceeds the lower but not the higher threshold level, change in radiant energy between sampling times is checked by No. 2 judger 138. Then, if, in addition to there being an increase in radiant energy, the rate of increase of radiant energy exceeds a prescribed value, it judges that there is a fire. Further, even if the radiant energy exceeds the higher threshold level in No. 1 fire judger 136 and No. 1 fire judger 136 judges that there is a fire, the change in radiant energy between sampling times is checked by No. 2 fire judger 138, and if there is almost no change, i.e. if the radiant energy is constant, it judges that there is a steady flame, a flame other than a fire, in the surveillance area, and therefore it does not judge that there is a fire.

With regard to the recognition results from intruder image recognizer 28, in the same way it performs a comparison between a threshold value and the number of pixels inside an edge sampled as a human form, and judges whether there is an intruder from the movement over time of an edge recognized as a human form.

Next, when a fire or intruder entity judgement result is obtained by abnormality judger 30, information showing the detection location, together with each kind of detection information, is sent to a host computer 32 provided in the central monitor room.

Figure 5:
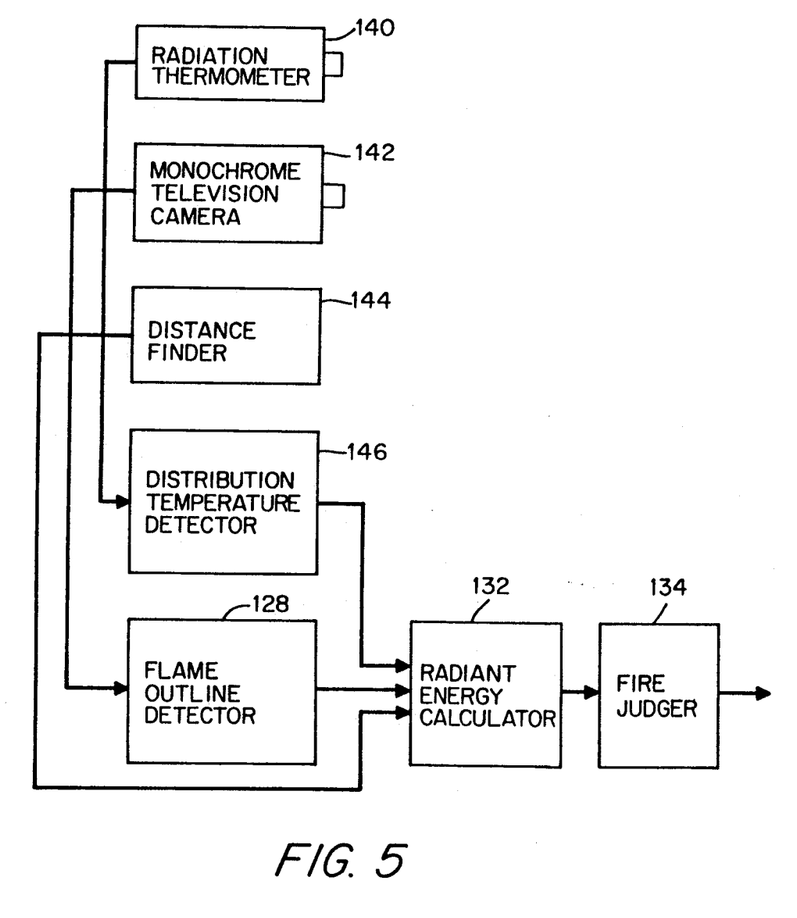
FIG. 5 is a block diagram showing the structure of a second embodiment of the invention.

FIG. 5 shows a second embodiment of the present invention. In this embodiment, the temperature of a surveillance area is detected by a radiation thermometer 140 and stored two-dimensionally in distribution temperature detector 146. For detection of the distance to the flames a laser or other distance finder 144 is used, and since temperature detection using the G/R component ratio of a color image as in the first embodiment is not necessary, flame outline is detected from luminance signals by flame outline detector using a monochrome television camera 142. Radiant energy calculator 132 and fire judger 30a are as in the embodiment shown in FIG. 2.

Next, the processing performed when a fire or intruder entity judgement is obtained by abnormality judger 30 will be explained.

Host computer 32 comprises a monitor display 42, the computer itself 44 and as an operation unit a keyboard 46. When an abnormality detection report is received by an abnormality judger 30 of image processing section 16 which is provided on the terminal side, in the same way a pre-alarm outputter 40 of fire alarm panel 34 installed in the central monitor room is activated and a pre-alarm is given. Of course a pre-alarm outputter may be provided in the computer itself 44. At the same time together with a pre-alarm display a message display of location information about the surveillance area, e.g. surveillance area 12-1, in which a fire has broken out is displayed on monitor display 42.

Next, a pre-alarm output is performed in the host computer 32, and a surveillance person uses keyboard 46 to send the command to display the image of the location to the computer itself 44, which sends a switching control signal to a camera switcher 18 of image processing section 16. Thus, for example, even if at this time a television camera of a surveillance area other than the television camera of the surveillance area, 12-1, in which a fire has been detected, had been switched to, television camera 10-1 of surveillance area 12-1 where the fire has been recognized will be compulsorily switched to. Then pictures of the location where an abnormality has been recognized will be transferred onto the monitor display 42 via ADC 20 and frame memory 22. Of course, the switching command need not be given by the surveillance person operating keyboard 46, but may be given by sending a control signal automatically to camera switcher 18 simultaneously with the outputting of a pre-alarm, based on receipt by host computer 32 of abnormality detection information.

Next, when monitor display 42 has been switched to the abnormality location pictures by manual operation by a surveillance person or automatically, the surveillance person looks at the location pictures and if he confirms that there is a fire abnormality or a burglary abnormality, he for example performs confirmation input operation using the keyboard 46. As a result, alarm panel 34 receives an alarm command signal from the computer itself 44, and an actual alarm is issued. At the same time, in the case of a fire, a gang control signal is issued to control panel 36 to gang control smoke ducts, fire shutters and other anti-fire and anti-smoke equipment.

Again, if a burglary is detected automatic reporting to the police and/or other outside organizations is performed by an automatic notifier not shown in the illustrations.

It should be noted that the switching orders for mode switcher 24 of image processing section 16 come from host computer 32. Thus, for example, it is possible to carry out suitable mode switching by means of the timer control in the host computer 32 by dividing time into daytime and nighttime. Also it is possible to perform mode switching control by the output from either of a known fire sensor or a known intruder sensor in the monitor context. Of course mode switching can be carried out by manual operation using keyboard 46.

By providing television cameras 10-1~10-n with zoom control capability, scanning mechanisms etc., processing may be performed on monitor images taken scanning surveillance areas 12-1~12-n. Again, when monitor pictures are processed, if for example an abnormality is detected by pre-processing or the like, the television cameras 10-1~10-n may be directionally controlled so that the abnormality is as it were centered in the center of the screen, and then zoomed-up monitor images may be taken in and image recognition processing performed.

What is claimed is:

1. A surveillance monitor system using image processing, comprising:
    an image-taking means for taking an image of areascape of a surveillance area;
    a fire image recognition section for recognizing a fire from a monitor image taken by said image-taking device and outputting fire detection information;
    an intruder entity image recognition section for recognizing an intruding entity from a monitor image taken by said image-taking device and outputting intruder detection information;
    a mode switching section for specifying that a monitor image be processed by said fire image recognition section and/or said intruder entity image recognition section;
    a pre-alarm output section for outputting a pre-alarm in a central monitor room upon receipt of detection information from said fire image recognition section or said intruder entity image recognition section;
    an image switching section for switching, in response to said pre-alarm, a monitor image in said central monitor room to an image of a location where an abnormality has been detected;
    said fire image recognition section comprising fire judging means using image processing for judging whether or not there is a fire based on a radiant energy source's radiant energy found by a radiant energy calculating means;
    said fire judging means comprising flame outline sampling means for sampling as an outline of a flame an area whose luminance signals, included in an image taken by said image-taking means, exceed a prescribed level;
    at least temperature detection means for detecting a distribution temperature inside a flame outline sampled by said flame outline sampling means;
    distance measurement means for measuring a distance to a radiant energy source; and
    said radiant energy calculating means for calculating radiant energy from the radiant energy source, based on the distribution temperature inside the flame outline sampled by said flame outline sampling means;
    said image-taking means taking color images, and said temperature detection means finding for each pixel a flame surface temperature using a ratio of a G component to an R component (G/R) or a ratio of a B component to the R component (B/R) of said color images taken by said image-taking means and referring to a conversion table for converting to said distribution temperature.

2. A surveillance monitor system according to claim 1, wherein said fire judging means judges whether or not there is a fire, based on radiant energy obtained in each prescribed sampling cycle and on a change in radiant energy between sampling times.

3. A surveillance monitor system according to claim 1, wherein said temperature detecting means detects a distribution temperature of an image based on a measurement output of a radiation thermometer.

4. A surveillance monitor system according to claim 1, wherein said distance measurement means measures a distance to a radiant energy source by the amount of lens movement of an autofocus of said image-taking means or by using a distance finder.

* * * * *